April 2, 1935.   E. PAPPERT   1,996,684
SPECTACLE FRAME
Filed April 24, 1933
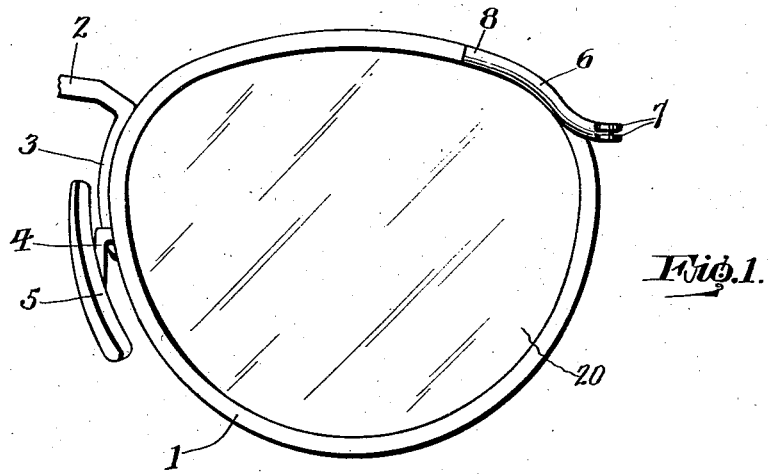
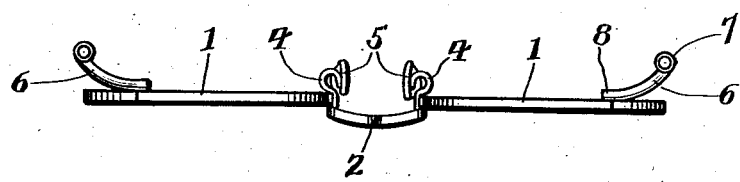
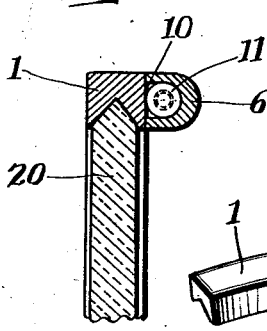
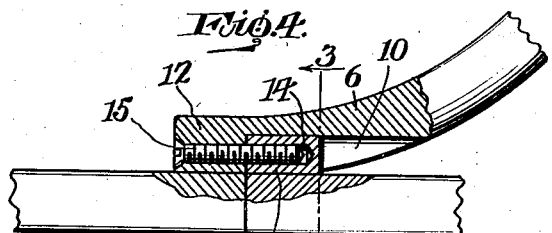
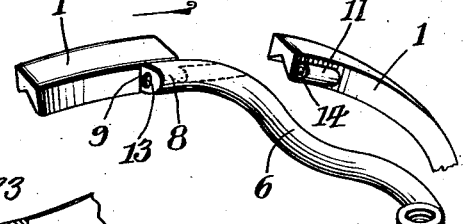
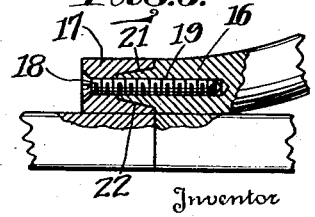
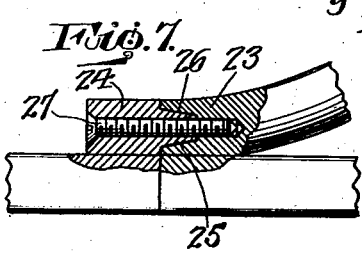
Inventor
Emanuel Pappert
By Geo. P. Kimmel
Attorney Patented Apr. 2, 1935

1,996,684

UNITED STATES PATENT OFFICE 1,996,684

SPECTACLE FRAME

Emanuel Pappert, Long Island City, N. Y., assignor to George P. Kimmel, Washington, D. C.

Application April 24, 1933, Serial No. 667,706

8 Claims. (Cl. 88—53)

This invention relates in general to spectacles and particularly to an endpiece construction therefor which will be capable of providing necessary adjustability.

In previous practice, it has been customary to provide spectacles, particularly rimmed spectacles with temple connections forming an integral part of relatively short and stiff endpieces, these endpieces being also used for the purpose of securing together the ends of the split metal rims.

Recently there has come into use a type of spectacle in which the endpieces are positioned above the horizontal median line of the lenses so that both the endpieces and the temples will lie above the normal useful field of side vision. However, these endpieces have in the past been made so short and rigid that it has been impossible to properly adjust them to the faces of the different wearers. Most faces are such as to require that the temple connection be positioned close to the lens rim itself, but some faces require these connections to be spaced considerably from the lens rim either in a sideward or rearward direction. Moreover, certain types of faces require that the endpieces be positioned either lower or higher with respect to the lenses than do other types.

It has been proposed to make the endpieces for this type of spectacle relatively long and pliable so that the temple connection might be moved or adjusted to a number of different positions with respect to the lenses as desired. These endpieces are secured preferably to the upper and rearward portions of the lenses or lens rims but in the past it has been necessary to provide a separate means for securing together the ends of the split rims.

It is therefore an object of this invention to provide adjustable endpieces which will be capable of the maximum amount of adjustment, which will be permanently attached to the lens rims, and yet which will embody a means for securing together the ends of the split rims to which they are attached. It is an object to make this construction as simple and inexpensive to manufacture as possible and yet to make it such that it will be very inconspicuous and attractive in its appearance. It is also an object that this construction will furnish a means for properly and positively aligning the two portions of the eye wires joined together thus insuring against breakage of lenses due to improper alignment.

Other objects and advantages of this invention will become apparent from the following description taken in connection with the accompanying drawing, it being distinctly understood that the same are by way of illustration and example only and are not to be taken as in any way limiting the spirit or scope of this invention. The spirit and scope of this invention is to be limited only by the prior art taken in connection with the accompanying claims.

Referring now more particularly to the drawing in which like numerals indicate corresponding parts throughout:

Figure 1 is a rear view of one of the lens frames and associated endpiece of a spectacle constructed in accordance with this invention.

Figure 2 is a plan view of a pair of spectacles constructed in the manner illustrated in Figure 1.

Figure 3 is an enlarged sectional view taken on the line 3—3 of Figure 4.

Figure 4 is an enlarged view partly in section illustrating the manner of securing together the two parts of the split rims.

Figure 5 is a detailed perspective view illustrating the endpiece construction and the manner in which the rims are secured together at their splits.

Figure 6 is a view similar to Figure 3 illustrating a slightly modified form.

Figure 7 is a view similar to Figures 3 and 6 and illustrating still another modification.

The spectacles illustrated in the drawing consist in general of a pair of lens rims 1 connected together at their nasal sides by means of a bridge 2 which may be of any suitable or conventional configuration. The bridge 2 is preferably provided with a pair of downwardly extending legs 3 which are secured along the nasal edges of the rims 1 respectively. A pair of rearwardly extending arms 4 are secured to the nasal sides of the rims 1 at the horizontal median thereof and carry nose pads 5 at their rearward ends.

The endpiece member consists of an elongated arm 6 having a bifurcated portion at one end thereof forming a pair of ears 7 adapted to receive the end of a temple between them. The lens rim 1 is split at a point on its upper periphery and adjacent its temporal side, and the end of the endpiece which is opposite the temple connection is firmly secured to one of the split ends as at 8. For the purpose of thus securing it in place, it is provided with a flat face 9 which is adapted to abut against the surface of the rim and be secured thereto by suitable means such as solder or the like. This securing may be either permanent or detachable whichever is found most convenient and desirable. The portion of the endpiece which is secured to the end of the rim is arranged to extend substantially parallel to the lens rim to a point beyond the end to which it is attached. A hollow cylindrical cavity 10 is formed in this portion of the endpiece for the purpose of receiving with a snug fit the tubular member 11 which is secured to the opposite end of the eye wire.

The cavity 10 and the tubular member 11 forming a snug fit between them, it will be seen that the ends of the rim will be positively and accurately positioned with respect to each other, thus preventing it from any misalignment which might cause lens breakage or other serious consequences. The end 12 of the endpiece which is secured to the end of the rim 1 is provided with an opening 13 therethrough and the tubular member 11 is provided with an internally threaded opening 14 therein for the purpose of receiving a screw 15 to secure the two parts together.

In Figure 6, the position of the endpiece and the tubular member has been reversed, the end 16 of the endpiece being secured to one end of the split rim and extending outwardly along the same portion to which it is secured. A tubular member 17 is secured to the other end of the split rim and is adapted to abut against the end of the endpiece member. The tubular member 17 is provided with an opening therethrough for the purpose of receiving the screw 18 and the end of the endpiece is tapped at 19 to threadedly receive said screw for securing the split ends of the rim together and properly positioning the lens 20 within the rim. In order to assist in the alignment of the parts, a conical projection 21 formed on the end of the endpiece member is adapted to interfit with a conical recess 22 formed in the tubular member 17.

In Figure 7, the end of the endpiece 23 is arranged in substantially the same manner as that illustrated in Figure 6, and a tubular member 24 is likewise provided corresponding to the tubular member 17. In this modification, however, the conical projection 25 is formed on the end of the tubular member 24 and is adapted to interengage with the conical recess 26 in the end of the endpiece. A screw 27 passes through the tubular member 24 and threadedly engages with the endpiece in the same manner as illustrated in Figure 6.

It is noteworthy that in each form illustrated, the endpiece is secured to the rear of the rim and extends outwardly and downwardly to whatever position may be desired. Its length makes it capable of ample adjustment for any purpose and allows the position of the temple connections to be altered in accordance with the characteristics of the wearer's face. At the same time, the means for securing together the ends of the split rim are so embodied in and made a part of the endpiece itself that the rim connection will not be discernible by ordinary observation. The two ends of the rim will be accurately aligned with each other upon bringing the same together and will be firmly secured together by means of the screws provided.

It is to be understood that various changes in the construction as illustrated may be made without departing from the spirit or scope of the appended claims.

What I claim is:—

1. In a pair of spectacles, a lens rim, said rim being split at a point on its upper periphery, an elongated arm having one of its longitudinal sides secured at one end to one end of said rim in a position substantially parallel thereto, a tubular member secured to the other end of said rim and adapted to engage said arm when the ends of said rim are brought together, means disposed longitudinally of said tubular member and the end portion of said arm for securing said tubular member to said arm to hold the ends of the rim together, and a temple connection at the opposite end of said arm, said arm being pliable throughout its length to permit of a wide adjustment of the position of said temple connection.

2. In a pair of spectacles, a lens rim split at a point on its upper periphery, an elongated arm having one of its longitudinal sides secured at one end to the rear of and adjacent one end of said rim in a position substantially parallel thereto, a tubular member secured to the rear of the other end of said rim and adapted to have its longitudinal axis aligned with the longitudinal axis of the end portion of said arm when the ends of said rim are brought together, means disposed along the longitudinal axis of said tubular member and the end portion of said arm for securing said tubular member to said arm to hold the ends of the rim together, and a temple connection at the opposite end of said arm, said arm being pliable throughout its length to permit of a wide adjustment of the position of said temple connection.

3. In a pair of spectacles, a lens rim, said rim being split at a point on its upper periphery, an elongated arm having one of its longitudinal sides secured at one end to the rear of and adjacent one end of said rim in a position substantially parallel thereto, a tubular member secured to the rear of the other end of said rim and having parts adapted to interengage with parts of said arm to align the ends of said rim and to align the longitudinal axis of said tubular member with the longitudinal axis of the end of said arm when the ends of the rim are brought together, means disposed longitudinally of said tubular member and the end portion of said arm for securing said tubular member to said arm to hold the ends of the rim together, and a temple connection at the opposite end of said arm, said arm being pliable throughout its length to permit of a wide adjustment of the position of said temple connection.

4. In a pair of spectacles, a lens rim, said rim being split at a point on its upper periphery, an elongated arm having one of its longitudinal sides secured at one end to the rear of and adjacent one end of said rim in a position substantially parallel thereto, a tubular member secured to the rear of the other end of said rim and having parts adapted to interengage with parts of said arm to align the ends of said rim and to align the longitudinal axis of said tubular member with the longitudinal axis of the end of said arm when the ends of said rim are brought together, means disposed longitudinally of said tubular member and the end portion of said arm for securing said tubular member to said arm to hold the ends of the rim together, said arm extending rearwardly and outwardly from its attachment to said rim, and a temple connection at the free end of said arm, said arm being pliable throughout its length to permit of a wider adjustment of the position of said temple connection.

5. In a pair of spectacles, a lens rim split at a point on its upper periphery, an elongated arm secured to the rear of and adjacent one end of said rim in a position substantially parallel thereto, a tubular member secured to the rear of and adjacent the other end of said rim in a position substantially parallel thereto, said tubular member being of substantially the same diameter as said arm and adapted to be aligned with and abut the end of the same when the rim is in closed position, said arm having a recess in the end thereof and said tubular member having a part adapted to engage said recess and align said tubular member with said arm, means for securing said tubular member to said arm in aligned position, and a temple connection at the free end of said arm.

6. In a pair of spectacles, a lens rim split at a point on its upper periphery, an elongated arm secured to the rear of and adjacent one end of said rim in a position substantially parallel thereto, a tubular member secured to the rear of and adjacent the other end of said rim in a position substantially parallel thereto, said tubular member being of substantially the same diameter as said arm and adapted to be aligned with and abut the end of the same when the rim is in closed position, said tubular member having a recess in the end thereof and said arm having a part adapted to engage said recess and align said tubular member with said arm, means for securing said tubular member to said arm in aligned position, and a temple connection at the free end of said arm.

7. In a pair of spectacles, a lens rim split at its top, an elongated lengthwise curved arm secured at one end to the rear face of the top of said rim adjacent one of the ends of the latter, said arm being disposed in a position substantially parallel to and extending outwardly beyond the ends of the rim, said arm and rim being formed lengthwise thereof with interengaging parts, means for securing said coacting parts together to maintain the rim in lens edge encompassing and lens holding positions, said arm curving rearwardly in a temple direction from said securing means, a temple connection at the other end of said arm, that portion of said arm extended rearwardly of said securing means being pliable to permit of a wide adjustment of the position of said temple connection.

8. In a pair of spectacles, a lens rim split at its top, an elongated lengthwise curved arm secured at one end to the rear face of the top of said rim adjacent one of the ends of the latter, said arm being disposed in a position substantially parallel to and extending outwardly beyond the ends of the rim, said arm and rim being formed lengthwise thereof with interengaging parts, means for securing said coacting parts together to maintain the rim in lens edge encompassing and lens holding positions, said arm curving rearwardly in a temple direction from said securing means, a temple connection at the other end of said arm, that portion of said arm extended rearwardly of said securing means being pliable to permit of a wide adjustment of the position of said temple connection, and said temple connection being arranged completely below said coacting parts and above the field of vision at the temple side of the lens.

EMANUEL PAPPERT.